(12) United States Patent
Gulli

(10) Patent No.: US 9,140,305 B2
(45) Date of Patent: Sep. 22, 2015

(54) SEALING UNIT, IN PARTICULAR FOR ROLLING BEARINGS

(71) Applicant: Carmelo Gulli, Turin (IT)

(72) Inventor: Carmelo Gulli, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/506,580

(22) Filed: Oct. 3, 2014

(65) Prior Publication Data

US 2015/0097340 A1    Apr. 9, 2015

(30) Foreign Application Priority Data

Oct. 3, 2013  (IT) .............................. TO2013A0800

(51) Int. Cl.
*F16J 15/40* (2006.01)
*F16C 33/80* (2006.01)
*F16C 33/78* (2006.01)
*F16J 15/447* (2006.01)
*F16J 15/32* (2006.01)
*F16C 33/76* (2006.01)
*F16C 41/00* (2006.01)

(52) U.S. Cl.
CPC ............. *F16C 33/805* (2013.01); *F16C 33/782* (2013.01); *F16C 33/7883* (2013.01); *F16C 33/80* (2013.01); *F16J 15/3264* (2013.01); *F16J 15/4478* (2013.01); *F16C 33/768* (2013.01); *F16C 41/007* (2013.01); *F16C 2326/02* (2013.01)

(58) Field of Classification Search
CPC ..... F16J 15/32; F16J 15/3204; F16J 15/3232; F16J 15/3248; F16J 15/3252; F16J 15/3256
See application file for complete search history.

(56) References Cited

U.S. PATENT DOCUMENTS

| | | | |
|---|---|---|---|
| 4,669,895 A | | 6/1987 | Colanzi et al. |
| 5,028,054 A | * | 7/1991 | Peach ........................... 277/348 |
| 5,201,529 A | * | 4/1993 | Heinzen ........................ 277/351 |
| 7,055,828 B2 | * | 6/2006 | Hatch et al. ................... 277/570 |
| 2003/0201609 A1 | * | 10/2003 | Hood et al. .................... 277/409 |
| 2004/0026867 A1 | * | 2/2004 | Adams et al. ................. 277/349 |
| 2007/0085276 A1 | | 4/2007 | Hartmann et al. |
| 2011/0150380 A1 | | 6/2011 | Walter et al. |

FOREIGN PATENT DOCUMENTS

| | | |
|---|---|---|
| DE | 1826022 U | 2/1961 |
| DE | 102008017409 A1 | 10/2009 |
| EP | 1382868 A2 | 1/2004 |
| EP | 0980999 B1 | 7/2004 |
| JP | 2002333035 A | 11/2002 |
| JP | 200314897 A | 5/2003 |

* cited by examiner

*Primary Examiner* — Gilbert Lee
(74) *Attorney, Agent, or Firm* — Bryan Peckjian; SKF USA Inc. Patent Dept.

(57) ABSTRACT

A sealing unit having a first annular rotating shield and a second annular shield is provided. The second annular shield is fixed and arranged in front of the first shield for delimiting therebetween a first annular chamber and a sealing ring provided with at least a first and a second annular lips, which extend axially and radially projecting from a flange portion of the second shield and towards a flange portion of the first shield, inside the annular chamber. The first shield integrally supports a third annular lip that extends projecting from the first shield towards one of the first and second lips without touching it for defining a second dynamic labyrinth seal between the first and second shield and inside the annular chamber.

12 Claims, 1 Drawing Sheet

SEALING UNIT, IN PARTICULAR FOR ROLLING BEARINGS

FIELD OF THE INVENTION

The present invention relates to a sealing unit, in particular for rolling bearings.

BACKGROUND OF THE INVENTION

The sealing units adapted to equip the rolling bearings of wheel hub assemblies are formed by so-called "packet" or "cassette" seals including a first and a second annular shields, mounted in front of each other so as to delimit an annular chamber between the shields, inside which chamber a series of sealing lips are arranged, carried by a sealing ring integrally fixed to one of the shields, generally the shield adapted in use to remain stationary. These sealing lips exert a sliding or labyrinth seal on respective sealing surfaces of the rotating shield and may have various shapes and be optionally charged by springs. An example of such a type of seal/sealing unit is given by EP0980999B1.

While they are satisfactory, the known "packet" sealing units have relatively high frictions due to the sliding lips charged by springs or in any case mounted with strong interferences. Sealing units including only labyrinth seals, in addition to being relatively large sized and complex to be implemented, have low frictions with reduced sealing efficiencies, often not sufficient for several applications, such as in the automotive field. DE102008017409 does not solve the problem.

SUMMARY OF THE INVENTION

The object of the present invention is to provide a sealing unit which is free from the above-described drawbacks, having low costs and high ease of manufacture, high protection efficiency of the rolling bodies, reduced axial and radial dimensions and above all, a reduced friction.

A sealing unit is therefore provided according to the invention and includes a rotating shield having a sealing lip which cooperates labyrinth-wise with at least one lip of a pair of sealing lips carried by the stationary shield, which in turn cooperate, either both or only one of them, labyrinth-wise with a flange portion of the rotating shield. A synergic "pumping" effect of the contaminants towards the exterior of the annular chamber defined between the shields is thus obtained, allowing excellent sealing efficiencies to be obtained also when none of the above three lips exerts any sliding seal. Accordingly, the frictions are drastically reduced while keeping a suitable sealing efficiency, such as for applications on wheel hubs. Only one further lip, called "grease guard", facing in use towards the rolling bodies to be protected, is implemented as a sliding lip, but only with a reduced interference, so as to still keep frictions low.

BRIEF DESCRIPTION OF THE FIGURE

The invention will now be described with reference to the accompanying drawings which show a non-limiting embodiment thereof, in which.

DETAILED DESCRIPTION OF THE INVENTION

Figures 1, 2:
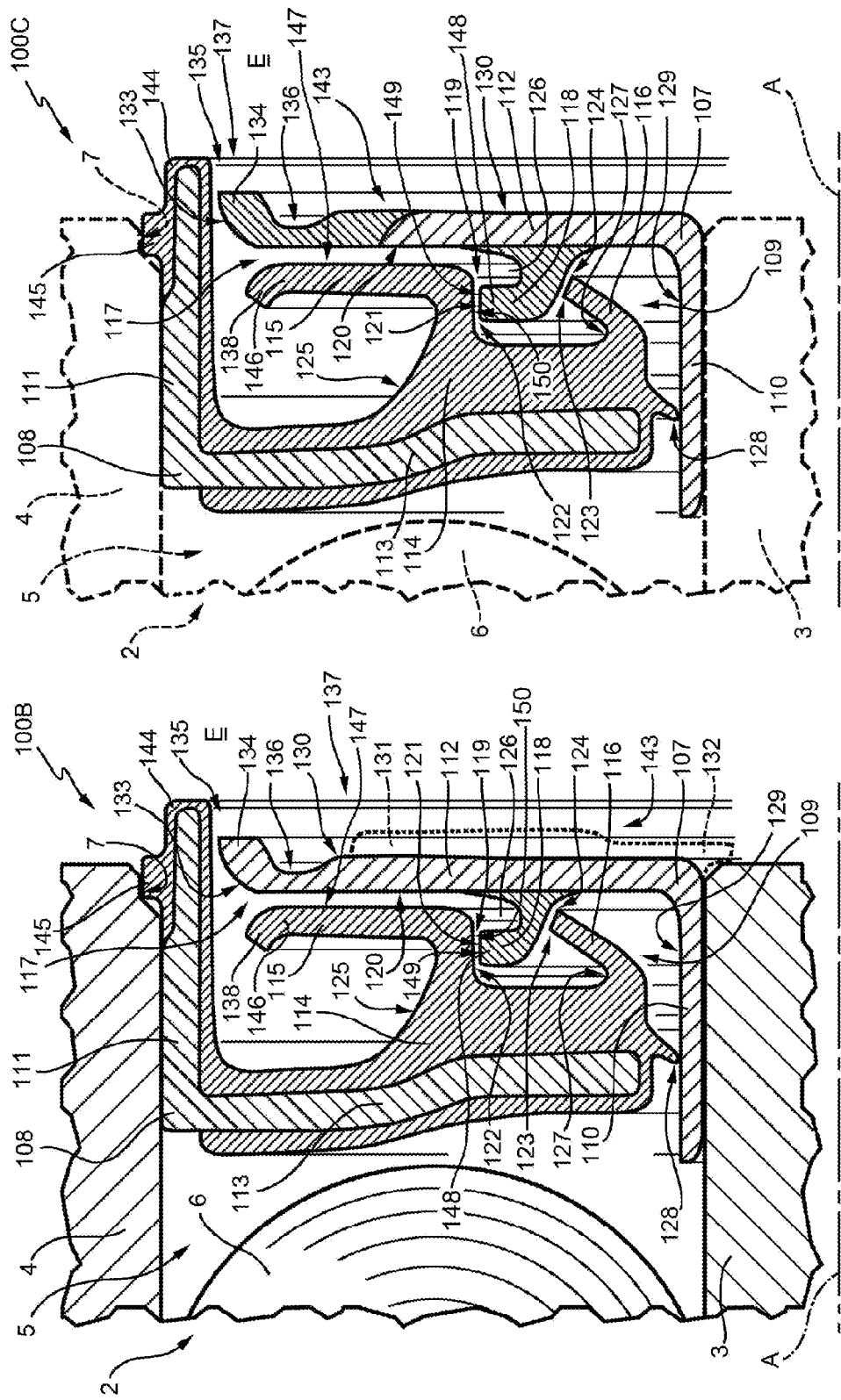
FIG. 1 schematically shows a longitudinal elevation radial sectional view of a first embodiment of the sealing unit according to the invention applied to a rolling bearing, shown only partially for simplicity.
FIG. 2 diagrammatically shows a radial sectional view of a possible variant of the sealing unit of FIG. 1.

With reference to FIGS. 1 and 2, reference numeral 100 (FIG. 1) indicates a low friction sealing unit, in particular designed to be mounted to a rolling bearing 2 of a wheel hub assembly, known and not shown as a whole for simplicity, for being inserted between a first member 3 and a second member 4 in relative rotation, in the example shown defined by the inner ring 3 and by the outer ring 4 of bearing 2, for fluid-sealingly insulating from an external environment, indicated with letter "E", an annular cavity 5 delimited between members 3 and 4 and accommodating, in the example shown, a plurality of rolling bodies 6 of bearing 2.

The sealing unit 100 is implemented in FIG. 1 according to a first embodiment, indicated with reference numeral 100B, and in FIG. 2 with a second embodiment, indicated with reference numeral 100C.

Both sealing units 100B and 100C, which hereinafter will be described together for common parts using the same reference numerals for simplicity, have a symmetry or rotation axis A and comprise a first annular shield 107 in use angularly integrally constrainable to the first member or inner ring 3 for rotating therewith about the axis A and a second annular shield 108 in use angularly integrally constrainable to the second member or outer ring 4, coaxial to the first shield 107 and stationary with respect to shield 107, with which it defines an annular chamber 109.

The annular chamber 109 is delimited on opposite sides, in radial direction, by respective sleeve portions 110, 111, coaxial to each other, of the first shield 107 and of the second shield 108, by means of which the shields 107, 108 are constrained to the members 3 and 4, respectively, in known manner, for example by force fitting; and, in axial direction, by respective flange portions 112, 113 of the first shield 107 and of the second shield 108, arranged reciprocally facing each other.

The sealing units 100B and 100C further comprise a sealing ring 114 integrally carried by shield 108 and provided with at least a first annular lip 115 and a second annular lip 116 which extend axially and radially projecting from the flange portion 113 and towards the flange portion 112, inside the annular chamber 109.

According to a first aspect of the invention, at least one of the lips 115 and 116 (both lips in the non-limiting examples shown) cooperates/cooperate with the flange portion 112 of the first shield 107 without touching it but with a minimum axial clearance (in the order of the millimeter or less), which first shield is in use rotating about the axis A with respect to the second shield 108.

Therefore, lip 115 defines a first, radially oriented, dynamic labyrinth seal 117 with the flange portion 112 and inside the annular chamber 109; here and hereinafter, "dynamic" means that seal 117 is exerted between two members in relative motion and, in particular, that the moving member (rotating shield 107, in this case) is that facing in use towards the external environment E from which the contaminants, which try to penetrate cavity 5, come.

In combination with the foregoing, shield 107 integrally supports a third annular lip 118 which extends projecting from shield 107 towards one of lips 115,116 carried by the shield in use stationary 108 (in the non-limiting example shown towards lip 115) without touching it, for defining between shields 107 and 108 and inside the annular chamber 109 a second dynamic labyrinth seal 119 oriented perpendicularly to the dynamic labyrinth seal 117; accordingly, dynamic labyrinth seal 119 is axially oriented.

The annular sealing lips 115, 116 and 118, as well as the whole sealing ring 114, are elastically deformable as they are made of elastomeric material. Vice versa, shields 107, 108 are preferably made of metal, for example a sheared and bent/deep-drawn sheet, or wholly or partly of a synthetic molded plastic material, but in any case of a stiffer material than that used for lips 115, 116 and 118.

A further common aspect of both embodiments of the invention consists, as will be seen, in that the flange portion 112 of the rotating shield 107 is arranged in use so as to delimit the annular chamber 109 towards the external environment E, shield 107 defining in use an axially outer shield of the sealing unit 100B/C with respect to the annular cavity 5 defined between the first and second members 3 and 4.

According to the embodiments shown in FIGS. 1 and 2, lips 115, 116 are arranged in a sequence in radial direction inside the annular chamber 109, the second lip 116 being arranged radially closer to the rotation axis A of the first shield 107 with respect to the first lip 115. Moreover, both lips 115, 116 cooperate closely, but without touching it, with the flange portion 112 of the first shield 107, for defining a sequence of labyrinths with such a flange portion 112, which labyrinths are interposed in series in radial direction between the sleeve portion 110 of shield 107 and the sleeve portion 111 of shield 108, the outermost of which is that defining the dynamic labyrinth seal 117.

The third annular lip 118 is carried by a first face 120 facing towards shield 108 of the flange portion 112, axially and radially projecting therefrom and extends inside the annular chamber 109 so as to be interposed in series, according to a radial direction, between the first lip 115 and the second lip 116; a free end edge 121 of lip 118 faces towards the first lip 115 and is arranged, in a radial section (sheet plane in FIGS. 1 and 2), in a position immediately beneath and close to the first lip 115, so as to define the second dynamic labyrinth seal 119 with an extrados portion 122 of the first lip 115 facing towards shield 107.

Moreover, lip 118 is shaped and arranged so as to define a third dynamic labyrinth seal 124 with an intrados portion 123 of lip 116 facing towards the second shield 108.

Moreover, according to an aspect of the invention, lips 115, 116 and 118 are U-shaped the lips 115, 118 and V-shaped the lip 116 in radial section, so as to define a sequence of annular drip elements 125, 126, 127 in radial direction, arranged in series on top of each other and thereby delimit a plurality of recesses inside the annular chamber 109, which recesses constitute the drip elements 125, 126, 127 and are arranged in series in a sequence in radial direction, separate from one other by at least the dynamic labyrinth seals 119 and 124.

In particular, the first dynamic labyrinth seal 117 extends for the whole radial extension of the first annular lip 115, which, according to the invention and as already described, has a selected shape of a lower case U facing towards the flange portion 112; a branch 146 of the U-shaped lip 115 is substantially rectilinear and directed perpendicularly to axis A and delimits the labyrinth seal 117 with a flat face 147 thereof, which face extends for substantially the whole extension or radial length of lip 115 in front of face 120, also flat, of the flange portion 112 of shield 107, forming with face 120 a rectilinear, relatively long channel in radial direction, which channel defines the dynamic labyrinth seal 117.

Also the third annular lip 118 is U-shaped, in particular it presents in radial section the shape of a lower case U and has a branch 148 directed radially, perpendicularly to axis A and that ends with the free edge 121; the free edge 121 is delimited by a flat surface 149 directed parallel to axis A and arranged radially on the inner side of lip 115, radially "below" the extrados portion 122, which is defined by the "bottom" of the U formed by lip 115 and from which branch 146 departs. The extrados portion 122 is, in particular delimited towards edge 121 by a flat surface 150 directed parallel to axis A and parallel to surface 149; surface 150 is adjacent to surface 149, separated therefore by a small radial gap only, so defining with surface 149 the dynamic labyrinth seal 119 axially directed.

Finally, the sealing units 100B and 100C comprise a fourth annular lip 128 integrally obtained with the sealing ring 114 and the related lips 115 and 116. Lip 128 extends projecting from the flange portion 113 on an opposing side with respect to lip 116 and in use, on an opposing side with respect to the external environment E and cooperates with slight interference with a radially outer lateral surface 129 of the sleeve portion 110, so as to define a sliding radial seal therewith. Lip 128 constitutes a so-called "grease guard" lip and is constantly lubricated with grease arranged in use inside cavity 5 towards the rolling bodies 6 and possibly, also inside chamber 109, between lip 116 and the sleeve portion 110.

In the sealing unit 100B, the flange portion 112 of the rotating shield 107 (adapted to be mounted to the vehicle inner side of a wheel hub) supports, on a second face 130 thereof facing on an opposing side with respect to shield 108, an annular insert 131 (shown with a dashed line) made of an elastomer (such as ABS) which is at least partly magnetized, so as to define a known signal generating element or encoder for a known sensor, not shown for simplicity, of an ABS or anti-skid or ESP system of a vehicle. Insert 131 at least partly covers face 130 up to the sleeve portion 110 and has a first radial annular projection 132 which extends radially projecting from the sleeve portion 110 of the first shield 107 towards the rotation axis A and on the inside of the sleeve portion 110, and which annular projection 132 is shaped so as to define in use an axial stop shoulder for determining a fixed axial mounting position of the first shield 107 to member 3.

In addition to the presence or not of the annular insert 131, the sealing units 100B and 100C differ from each other in that a radially outer edge 133 of the flange portion 112 of the first shield 107 is made of a different material; in the case of the sealing unit 100B, of the same material as the rest of shield 107; in the case of the sealing unit 100C, of a synthetic plastic or elastomer material, in any case different from and less stiff than, the material of which the rest of the first shield 107 is made.

In any case, edge 133 has the same shape, both in the sealing unit 100B and in the sealing unit 100C. In particular, edge 133, which is opposite to the sleeve portion 110, is shaped so as to define, on an opposing side with respect to the annular chamber 109 and in use, towards the external environment E, a first axial annular projection 134 which extends axially projecting with respect to face 130, on an opposing side with respect to the flange portion 113 and in the immediate vicinity of the sleeve portion 111 of the second shield 108 for forming a first labyrinth pre-seal 135 with the second shield 108 towards the exterior of the annular chamber 109; in the examples shown, face 130 is further provided, in a position immediately adjacent to projection 134 and radially towards the rotation axis A, with a curved bottom annular groove 136 adapted to define, together with insert 134, a centrifuging element 137 arranged on the exterior of the annular chamber 109 and in use, on the exterior of the annular cavity 5.

According to another aspect of the invention, in all the embodiments shown and described, the sleeve portion 111 of the second shield 108 extends axially projecting with respect to the flange portion 112 of the first shield 107 on the side opposite to the annular chamber 109 so as to define in use, with an annular end edge 142 thereof, opposite to the flange portion 113 of shield 108, a circular recess 143 arranged outside the annular cavity 5 and which surrounds the radially outer edge 133 of the flange portion 112 by the whole radial extension thereof; the annular edge 142 is wholly buried in an extension of the sealing ring 114 which forms an annular static sealing element 144 adapted to cooperate in use with the second member 4; the annular static sealing element 144 is provided with a second radially outer radial annular projection 145 which is also shaped so as to define in use an axial stop shoulder for determining a fixed axial mounting position of the second shield 108 to the second member 4. To this end, the member or outer ring 4 is provided with an annular seat 7 inside which projection 145 is accommodated in use, in axial abutment.

The invention claimed is:

1. A sealing unit for rolling bearings of wheel hub assemblies, adapted to be inserted between a first and a second member in relative rotation for fluid-sealingly insulating from an external environment an annular cavity defined between the first and second members, the sealing unit having a symmetry axis (A) and comprising:
   a first annular shield angularly integrally constrainable to the first member by a respective sleeve portion for rotating with the first member about the symmetry axis (A) and defining an axially outer shield of the sealing unit with respect to the annular cavity;
   a second annular shield angularly integrally constrainable to the second member, coaxial to the first shield, by a respective sleeve portion, and defining an axially inner shield of the sealing unit with respect to the annular cavity; the second annular shield and the first annular shield defining between them an annular chamber delimited on opposite sides, in the radial direction, by the sleeve portions, and, in the axial direction, by respective flange portions of the first and second shields arranged reciprocally facing, the flange portion of the first shield delimiting the annular chamber towards the external environment (E); and
   a sealing ring integrally carried by the second annular shield and provided with at least a first and a second annular lip that extend axially and radially projecting from the flange portion of the second shield and towards the flange portion of the first shield, inside the annular chamber; wherein
   i) the first and second lips are arranged in sequence in a radial direction inside the annular chamber and cooperate with the flange portion of the first shield without touching it, and define a first dynamic labyrinth seal with the flange portion of the first shield and inside the annular chamber;
   ii) the first shield integrally supports a third annular lip which extends projecting from the first shield towards the first and the second lip without touching them, for defining a second dynamic labyrinth seal; and wherein
   iii) the first dynamic labyrinth seal is oriented radially, while the second dynamic labyrinth seal is oriented perpendicularly to the first dynamic labyrinth seal;
   iv) the first dynamic labyrinth seal extends along the whole radial extension of the first annular lip;
   v) the first and the third annular lip are shaped as a lower case U and a free end edge of the third lip is facing towards the first lip and is arranged, in a radial section, in a position immediately below and close to the first lip;
   vi) the free edge of the third lip and an extrados portion of the first lip facing toward the sleeve portion of the first shield being delimited by respective flat surfaces directed parallel to each other and to the symmetry axis (A) such as to define there between the second dynamic labyrinth seal.

2. The sealing unit according to claim 1, wherein the second lip is arranged radially closer to the rotation axis (A) with respect to the first lip; the third annular lip supported in an axially and radially projecting manner by a first face of the flange portion of the first shield facing towards the second shield and extending inside the annular chamber to be interposed in series, according to a radial direction, between the first and the second lips.

3. The sealing unit according to claim 2, further comprising a free end edge of the third lip faces towards the first lip and is arranged, in a radial section, in a position immediately beneath and close to the first lip, to define the second dynamic labyrinth seal with an extrados portion of the first lip facing towards the first shield; and a third dynamic labyrinth seal with an intrados portion of the second lip facing towards the second shield.

4. The sealing unit according to claim 3, wherein the first, second and third lips define a sequence of annular drip elements in a radial direction, arranged in series inside the annular chamber in a radial direction, separated from one other by at least the second and third dynamic labyrinth seals.

5. The sealing unit according to claim 1, wherein the sealing ring further comprises a fourth annular lip which extends projecting from the flange portion of the second shield on an opposing side with respect to the second lip and, to the external environment (E) to the annular cavity defined between the first and second members; the fourth lip cooperating with slight interference with a radially outer lateral surface of the sleeve portion of the first shield, to define a sliding radial seal therewith.

6. The seal according to claim 1, wherein the first annular lip of the sealing ring is configured to extend axially away from the second annular shield and configured to extend radially away from the symmetry axis such, thereby, when viewed in axial cross section, forming a U-shape with an opening thereof facing radially away from the symmetry axis.

7. The seal according to claim 6, wherein the U-shape of the first annular lip of the sealing ring is further configured as a first drip element such that a pumping effect is provided to facilitate the rejection of contaminants from the annular cavity.

8. The seal according to claim 1, wherein the second annular lip of the sealing ring is configured to extend axially away from the second annular shield and configured to extend radially away from the symmetry axis such, thereby, when viewed in axial cross section, forming a U-shape with an opening thereof facing radially away from the symmetry axis.

9. The seal according to claim 6, wherein the U-shape of the second annular lip of the sealing ring is further configured as a second drip element such that a pumping effect is provided to facilitate the rejection of contaminants from the annular cavity.

10. A sealing unit for rolling bearings of wheel hub assemblies, adapted to be inserted between a first and a second member in relative rotation for fluid-sealingly insulating from an external environment an annular cavity defined between the first and second members, the sealing unit having a symmetry axis (A) and comprising:
   a first annular shield angularly integrally constrainable to the first member by a respective sleeve portion for rotating with the first member about the symmetry axis (A)

and defining an axially outer shield of the sealing unit with respect to the annular cavity;

a second annular shield angularly integrally constrainable to the second member, coaxial to the first shield, by a respective sleeve portion, and defining an axially inner shield of the sealing unit with respect to the annular cavity; the second annular shield and the first annular shield defining between them an annular chamber delimited on opposite sides, in the radial direction, by the sleeve portions, and, in the axial direction, by respective flange portions of the first and second shields arranged reciprocally facing, the flange portion of the first shield delimiting the annular chamber towards the external environment (E); and a sealing ring integrally carried by the second annular shield and provided with at least a first and a second annular lip that extend axially and radially projecting from the flange portion of the second shield and towards the flange portion of the first shield, inside the annular chamber; wherein i) the first and second lips are arranged in sequence in a radial direction inside the annular chamber and cooperate with the flange portion of the first shield without touching it, and define a first dynamic labyrinth seal with the flange portion of the first shield and inside the annular chamber;

ii) the first shield integrally supports a third annular lip which extends projecting from the first shield towards the first and the second lip without touching them, for defining a second dynamic labyrinth seal; and wherein iii) the first dynamic labyrinth seal is oriented radially, while the second dynamic labyrinth seal is oriented perpendicularly to the first dynamic labyrinth seal;

iv) the first dynamic labyrinth seal extends along the whole radial extension of the first annular lip;

v) the first and the third annular lip are shaped as a lower case U and a free end edge of the third lip is facing towards the first lip and is arranged, in a radial section, in a position immediately below and close to the first lip;

vi) the free edge of the third lip and an extrados portion of the first lip facing toward the sleeve portion of the first shield being delimited by respective flat surfaces directed parallel to each other and to the symmetry axis (A) such as to define there between the second dynamic labyrinth seal, wherein the flange portion of the first shield supports, on a second face thereof facing towards an opposing side of the second shield, an annular insert made of an at least partly magnetized elastomer, to define a signal generating element, which annular insert at least partly covers the second face up to the sleeve portion of the first shield and has a first radial annular projection which extends radially projecting from the sleeve portion of the first shield towards the rotation axis (A) of the first shield and on the inside of the sleeve portion of the first shield, which first radial annular projection is shaped to define an axial stop shoulder for determining a fixed axial mounting position of the first shield to the first member.

11. A sealing unit for rolling bearings of wheel hub assemblies, adapted to be inserted between a first and a second member in relative rotation for fluid-sealingly insulating from an external environment an annular cavity defined between the first and second members, the sealing unit having a symmetry axis (A) and comprising:

a first annular shield angularly integrally constrainable to the first member by a respective sleeve portion for rotating with the first member about the symmetry axis (A) and defining an axially outer shield of the sealing unit with respect to the annular cavity;

a second annular shield angularly integrally constrainable to the second member, coaxial to the first shield, by a respective sleeve portion, and defining an axially inner shield of the sealing unit with respect to the annular cavity; the second annular shield and the first annular shield defining between them an annular chamber delimited on opposite sides, in the radial direction, by the sleeve portions, and, in the axial direction, by respective flange portions of the first and second shields arranged reciprocally facing, the flange portion of the first shield delimiting the annular chamber towards the external environment (E); and a sealing ring integrally carried by the second annular shield and provided with at least a first and a second annular lip that extend axially and radially projecting from the flange portion of the second shield and towards the flange portion of the first shield, inside the annular chamber; wherein i) the first and second lips are arranged in sequence in a radial direction inside the annular chamber and cooperate with the flange portion of the first shield without touching it, and define a first dynamic labyrinth seal with the flange portion of the first shield and inside the annular chamber;

ii) the first shield integrally supports a third annular lip which extends projecting from the first shield towards the first and the second lip without touching them, for defining a second dynamic labyrinth seal; and wherein iii) the first dynamic labyrinth seal is oriented radially, while the second dynamic labyrinth seal is oriented perpendicularly to the first dynamic labyrinth seal;

iv) the first dynamic labyrinth seal extends along the whole radial extension of the first annular lip;

v) the first and the third annular lip are shaped as a lower case U and a free end edge of the third lip is facing towards the first lip and is arranged, in a radial section, in a position immediately below and close to the first lip;

vi) the free edge of the third lip and an extrados portion of the first lip facing toward the sleeve portion of the first shield being delimited by respective flat surfaces directed parallel to each other and to the symmetry axis (A) such as to define there between the second dynamic labyrinth seal, wherein a radially outer edge of the flange portion of the first shield, opposite to the sleeve portion of the first shield, is shaped to define, on an opposing side with respect to the annular chamber, and towards the environment external to the annular cavity delimited between the first and second members, a first axial annular projection that extends axially projecting with respect to a second face of the flange portion of the first shield facing on an opposing side of the second shield and in the immediate vicinity of the sleeve portion of the second shield for forming a first labyrinth pre-seal with the second shield towards the exterior of the annular chamber; optionally, the second face of the flange portion of the first shield being further provided, in a position immediately adjacent to the first axial annular projection and radially towards the rotation axis of the first shield, with a curved bottom annular groove adapted to define, together with the first axial annular projection, a centrifuging element arranged on the exterior of the annular chamber and, on the exterior of the annular cavity delimited between the first and second members.

12. A sealing unit according to claim 11, wherein the radially outer edge of the flange portion of the first shield is made of a different material, preferably synthetic or elastomeric plastic, from the material of which the rest of the first shield is made.

* * * * *